US005654543A

United States Patent [19]

Li

[11] Patent Number: 5,654,543

[45] Date of Patent: Aug. 5, 1997

[54] MASS SPECTROMETER AND RELATED METHOD

[75] Inventor: Gangqiang Li, Palo Alto, Calif.

[73] Assignee: Hewlett-Packard Company, Palo Alto, Calif.

[21] Appl. No.: 552,041

[22] Filed: Nov. 2, 1995

[51] Int. Cl.$^6$ .......... B01D 59/44; H01J 49/00

[52] U.S. Cl. .......... 250/287; 250/282

[58] Field of Search .......... 250/281, 287, 250/288, 282

[56] References Cited

U.S. PATENT DOCUMENTS

| | | | |
|---|---|---|---|
| 2,938,116 | 5/1960 | Benson et al. | 250/287 |
| 3,553,452 | 1/1971 | Tiernan et al. | 250/287 |
| 3,621,242 | 11/1971 | Ferguson et al. | 250/287 |
| 4,694,167 | 9/1987 | Payne et al. | 250/287 |
| 5,087,814 | 2/1992 | Ichimura et al. | 250/287 |
| 5,144,127 | 9/1992 | Williams et al. | 250/287 |
| 5,160,840 | 11/1992 | Vestal | 250/287 |
| 5,218,204 | 6/1993 | Hounk et al. | 250/288 |

FOREIGN PATENT DOCUMENTS

| | | | |
|---|---|---|---|
| 0266039 | 5/1988 | European Pat. Off. . | |
| 1288493 | 9/1992 | United Kingdom | 39/34 |
| 2266407 | 10/1993 | United Kingdom | 49/2 |
| WO92/19367 | 11/1992 | WIPO | 59/44 |

OTHER PUBLICATIONS

Ryan, P.W. et al, "Time-Dependence of the Electron-Impact-Induced Unimolecular Decay Process $C_3H_8^+ \rightarrow C_3H_7^+ + H$", *Chemical Physics Letters,* vol. 18, No. 3, pp. 329–332 (1973).

Chait, B.T. et al., "Fission Fragment Ionization Mass Spectrometry: Metastable Decompositions", *International Journal of Mass Spectrometry and Ion Physics,* vol. 41, pp. 17–29 (1981).

Myers, D.P. et al., "An Inductively Coupled Plasma—Time-of-Flight Mass Spectrometer for Elemental Analysis. Part I: Optimization and Characteristics", *Journal American Society for Mass Spectrometry,* vol. 5, pp. 1008–1016 (1994).

*Primary Examiner*—Bruce Anderson

[57] ABSTRACT

A time-of-flight mass spectrometer is disclosed having improved signal to noise characteristics and the ability to reject specific signal ions. The mass spectrometer includes a plasma source that generates the ions, a ion pulser that directs ions toward an ion detector, and a retarding grid assembly charged to repel noise ions. The retarding grid assembly maintains at least a predetermined minimum potential sufficient to repel all ions, except those which have been deliberately sampled by a deliberate pulse of the ion pulser. As a result, noise ions which unintentionally escape the ion pulser are repelled by the retarding grid assembly, and mass peaks are more easily detected and distinguished from background noise. Specific ions of the desired signal are also selectively rejected by stepping up the potential of the retarding grid assembly at a predetermined time calculated to correspond to the time-of-flight of the specific ions from the ion pulser. A grounded grid is also provided to maintain a field-free region away from the retarding grid assembly, such that rejection of ions may be tailored to a narrow range of ion masses.

21 Claims, 4 Drawing Sheets

MASS SPECTROMETER AND RELATED METHOD

The present invention relates to a mass spectrometer. In particular, it provides a time-of-flight mass spectrometer that has enhanced signal-to-noise characteristics. It also provides a time-of-flight mass spectrometer that can selectively reject specific ions, such as argon.

BACKGROUND

I. Introduction to Time-of-flight Mass Spectrometers

Plasma source mass spectrometers analyze the contribution and identity of various components that make up a substance. Typically, this is done by dissolving the substance in a solution of known composition, and by vaporizing and ionizing the solution using hot plasma. The ionized plasma is then extracted as a continuous stream into a measurement chamber, such as a vacuum. Inside the measurement chamber, an electric deflection device affects the movement of the ions, and this movement is detected using an ion detector. In particular, the ion detector measures the flight time of ions traveling from the electrical deflection device, and provides a read-out indicating the mass/charge ratio of the solution's components. Mass spectrometers have proved extremely useful in applications such as chemistry, biology and environmental science, where they assist with the detection and identification of trace components of the substance being measured.

Generally, time-of-flight mass spectrometers are configured to receive the stream of the hot, ionized plasma, and periodically sample the stream by selectively and deliberately propelling packets of ions perpendicular to the stream. That is to say, time-of-flight mass spectrometers typically sample the ions by passing them through an ion pulser, which uses an electronic pulse to radically change the path of the sampled ions and propel them toward the detector. Since the ions may have different masses, and the same pulse is applied by the ion pulser to all of the sampled ions, the ion pulser causes the individual ions to have different velocities and arrive at the ion detector at different times. The time of arrival after sampling usually represents the mass/charge ratio, and the quantity of charge detected at a particular time represents a particular component's contribution to the measurement sample.

II. The Problem of Noise

Noise in mass spectrometers typically exists when the ion detector falsely detects stray particles. This can be caused, for example, by photons or neutral species generated by a plasma that impact the detector, as well as by ions that unintentionally escape from the ion pulser.

In the case of a time-of-flight mass spectrometer, the stream of continuously injected ions is normally channeled by the ion pulser between two charged plates, such that potential barriers created by the plates hold the ions between the two plates. When the ions are sampled, the ion pulser pulses one of the plates to have a much greater electric potential, which creates an electric field gradient that propels ions perpendicularly to the stream and toward the ion detector. Since photons neutral species have a neutral charge, they are not affected by the ion pulser and do not contribute significantly to noise. However, ions can inadvertently escape the potential barrier created by the charged plates at times when the ion pulser is not deliberately sampling the ion stream. Because of the charge of the plates and the charge of the escaped ions, the ions are inadvertently propelled toward the detector by the plates and may be correlated with the most recent pulse of the ion pulser and falsely determined to be a fast or slow ion that represents a particular mass. In other words, these stray "noise" ions are typically not distinguished from the deliberately sampled "signal" ions, and can arrive at the ion detector at near random times.

III. Plasma Gas Ions At The Ion Detector

Many plasma ion sources commonly ionize the solution being measured using argon gas plasma. The argon gas is ionized along with the solution, but to a much greater extent; argon ions are produced approximately one million times as frequently as each ion of the solution. Thus, plasma gas ions, and in particular, argon ions, usually form a very strong component of the signal ions which it is not desired to measure. The large quantity of argon ions, however, can also temporarily deplete charge carriers at the ion detector, which renders it difficult to detect some trace masses that form part of the solution. Thus, the plasma gas ions, due to their sheer numbers, contribute both to the overall background noise, and also to temporarily influence the ion detector.

There has existed a definite need for a mass spectrometer that reduces noise, and that therefore provides greater accuracy. What is needed is a mass spectrometer that has a mechanism for discriminating against stray charges that create noise, but that does not significantly affect the primary signal ions that are to be measured. Further, a need also exists for a system that filters specific ions which it is desired not to measure, such as argon, and reject them entirely. The present invention solves these needs and provides further, related advantages.

SUMMARY OF THE INVENTION

The present invention solves the foregoing needs by providing a mass spectrometer that rejects noise ions without significantly affecting signal ions. Thus, it provides for a far more accurate spectrometer with a significantly enhanced limit of detection. Using the mass spectrometer of the present invention, small impurities and chemical presences are more readily detected, rendering the mass spectrometer even more useful in its standard applications, such as chemistry, biology and environmental science.

The mass spectrometer of the present invention includes an ionizing device that ionizes a sample, an ion detector, and an ion pulser that selectively propels ions toward the ion detector. The spectrometer also includes a retarding grid assembly positioned in front of the ion detector, to block the path of ions toward the ion detector. The retarding grid assembly has a predetermined minimum potential which is selected so as to be overcome by signal ions. That is, the retarding grid assembly admits ions that have been deliberately propelled by the ion pulser as part of a sampling of the stream from the ionizing device, but presents too strong a potential to stray ions, and hence, diverts them from the detector. Preferably, the retarding grid assembly is an electrically charged grid that has a potential just less than a pulsed voltage used by the ion pulser to deliberately sample ions from an ion stream and propel them toward the detector. As a result, only signal ions propelled by the pulsed voltage have sufficient energy to penetrate the retarding grid assembly and reach the ion detector.

In a more detailed aspect of the invention, the retarding grid assembly is controlled to reject specific ions. Since, in such a spectrometer, ions which are undesired for measurement can nevertheless sometimes form part of the sample, such ions will be unaffected by noise rejection and arrive at the detector at a specific time. Therefore, in this aspect of the invention, the retarding grid assembly is controlled to have a pulse applied to it that is greater than the pulsed voltage used by the ion pulser to launch the sample toward the detector, to selectively repel all ions. Therefore, in this ion-selective mode, the retarding grid assembly may be electrically pulsed at a specific times chosen to reject any specific ions, e.g., both argon and nitrogen ions. Alternatively, the retarding grid assembly may be controlled to have any specific voltage profile, e.g., have a potential that repels any ions, but which is specifically dropped at a specific time to admit only selective ions.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 6 illustrates a detected signal that represents detection of both argon and argon-hydrogen with a constant retarding grid assembly voltage of 500-volts. FIG. 7, by contrast, shows measurement of the same sample with the retarding grid assembly voltage pulsed an additional 200-volts (700-volts total) for 100-nanoseconds at a specific time after ion pulsing.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a mass spectrometer, namely, a time-of-flight mass spectrometer that uses a retarding grid assembly to provide noise discrimination, and also to discriminate against specific ions, such as argon. The invention, however, may also be applied to other types of systems as well.

I. Introduction To The Principal Parts

The preferred embodiment of the present invention is explained with reference to the accompanying FIGS. 1 and 2.

Figure 1:
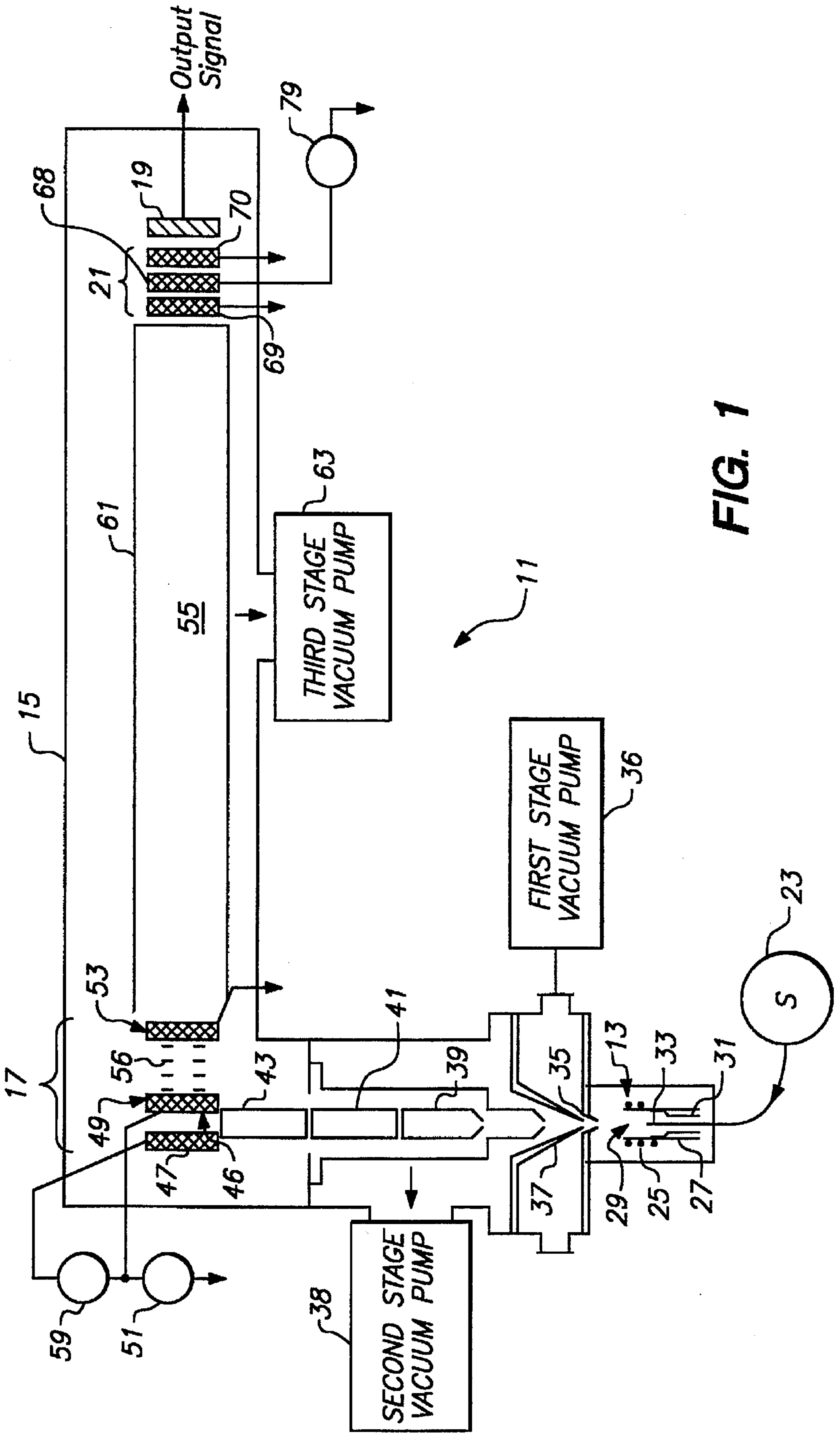
FIG. 1 is a schematic view of a time-of-flight mass spectrometer embodying the principles of the present invention.

FIG. 1 shows a schematic view of the preferred mass spectrometer 11. The spectrometer includes five basic components, including an ion generator (preferably, an inductively-coupled plasma source) 13, which ionizes a sample, and a vacuum chamber 15, which receives ionized plasma from the plasma source and which houses equipment used to analyze the plasma. In particular, the vacuum chamber houses an ion pulser 17, an ion detector 19 and a retarding grid assembly 21.

A substance is measured by first dissolving it in a solution (such as 2% nitric acid {$HNO_3$} in water), and then vaporizing the solution 23 by exposure to hot plasma. As indicated by FIG. 1, the inductively-coupled ion source 13 includes three concentric quartz glass tubes and a hollow, water-cooled coil 25. The coil 25 is wrapped about the outer-most tube 27, and has a radio frequency source coupled to it to generate intense magnetic fields in a middle region 29 of the three concentric tubes. The middle tube 31 and the outer-most tube 27 carry argon gas to the middle region 29. Being exposed to the intense magnetic fields, the argon gas becomes highly energized and very hot, having a temperature in the range of several thousand degrees Celsius. Some of the argon atoms lose an outermost electron, causing those atoms to become ionized with a single unit positive potential. The inner-most concentric tube 33 supplies the solution to the hot plasma, where the solution is vaporized by the intense heat, and the vapor of the solution mixes with the argon gas. In the middle region 29, ions of the solution also become ionized.

To detect these ions, the hot plasma is sucked from the plasma source through a cone orifice 35, which uses a first stage 25-liter/second vacuum pump 36 to provide a vacuum on the order of 1-Torr. The plasma is then sucked through a second cone orifice, or "skimmer" 37, which utilizes a second stage 330-liter/second vacuum pump 38 to provide a vacuum on the order of 1-milli-Torr. The plasma which has passed through the cone orifice 35 and the skimmer 37 is then passed into the vacuum chamber 15 through three ion lenses 39, 41 and 43, which focus ions from the hot plasma into a relatively narrow stream 45 of ions.

The ion pulser 17 receives the ion stream 45 and channels the ions into a main channel region 46, between a repelling plate 47 and an acceleration grid 49. Each of the repelling plate 47 and the acceleration grid 49 are connected to a 420-volt electric power supply 51, which supplies a constant positive voltage and helps maintain the ion stream 45 in the main channel region 46. A grounded grid 53 is employed to provide a field-free region 55 within the vacuum chamber 15 and to provide a route to ground for the acceleration grid 49 through a series of resistive elements 56.

Since the solution 23 is continually being injected into the plasma source 13, the ion stream 45 that passes into the vacuum chamber 15 should at any point in time represent the composition of the solution fairly accurately. As seen in FIG. 2, the ion stream proceeds along an entry direction 57 which runs generally between and parallel to the repelling plate 47 and the acceleration grid 49. The ion stream 45 is sampled by using a pulse mechanism 59 (seen in FIG. 1) to apply an additional 120-volt pulse to the repelling plate 45 in a two-percent duty cycle. At this point in time, the repelling plate 47 is charged to 540-volts, the acceleration grid 49 to 420-volts, and the second grid 53 is grounded. These potentials combine to generate a gradient electric field, which propels packets of ions between the repelling plate and the acceleration grid toward the ion detector, in a direction that is perpendicular to the stream. That is to say, the repelling plate 47 and acceleration grid 49 no longer help retain the ion stream 45 in the main channel region 46, but instead propel a packet of ions into an interior chamber 61 of the vacuum chamber and toward the ion detector 19. This action is indicated by the reference arrows 59 of FIG. 2. A third stage 240-liter/second vacuum pump 63 helps remove matter which is not sampled by the detector in this manner.

Figure 3:
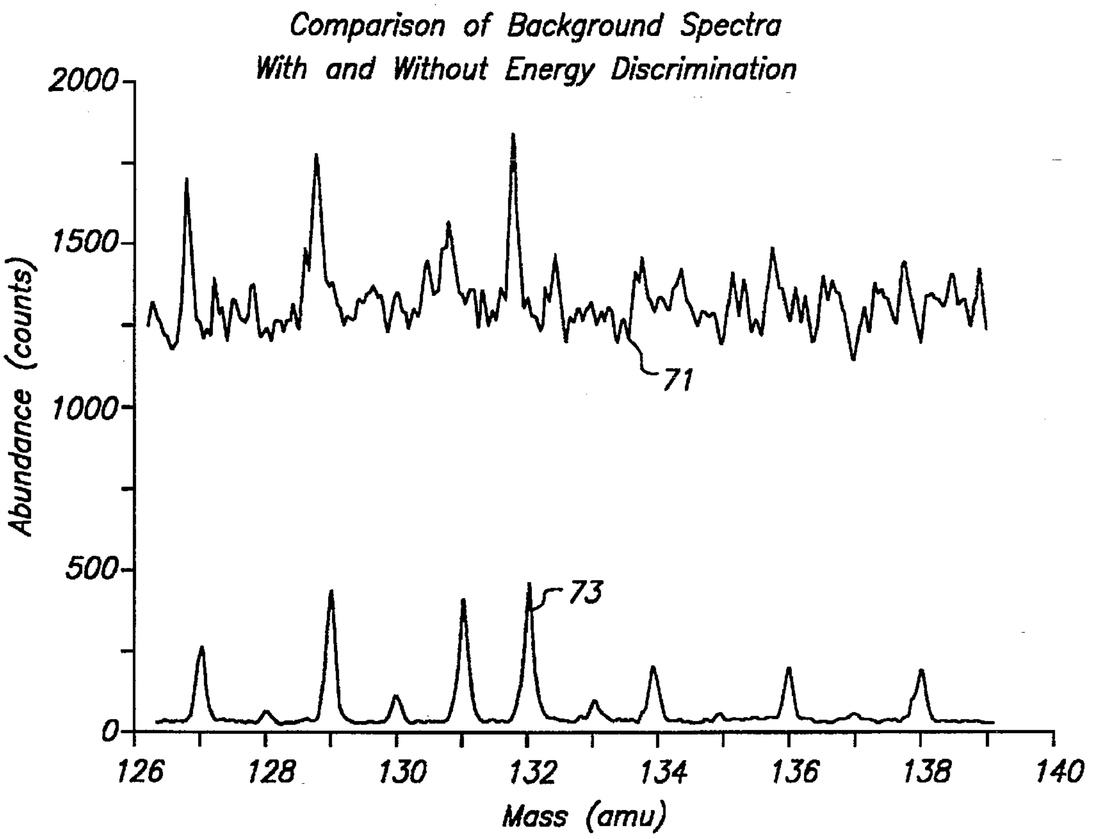
FIG. 3 is a comparison graph of a two measurements made upon a sample using the mass spectrometer of FIG. 1, with and without noise discrimination. In particular, a top graph shows a noisy signal where no potential applied to the retarding grid assembly, while a bottom graph illustrates a relatively noiseless signal, where a potential of 500-volts is applied to the retarding grid assembly.
Figure 7:
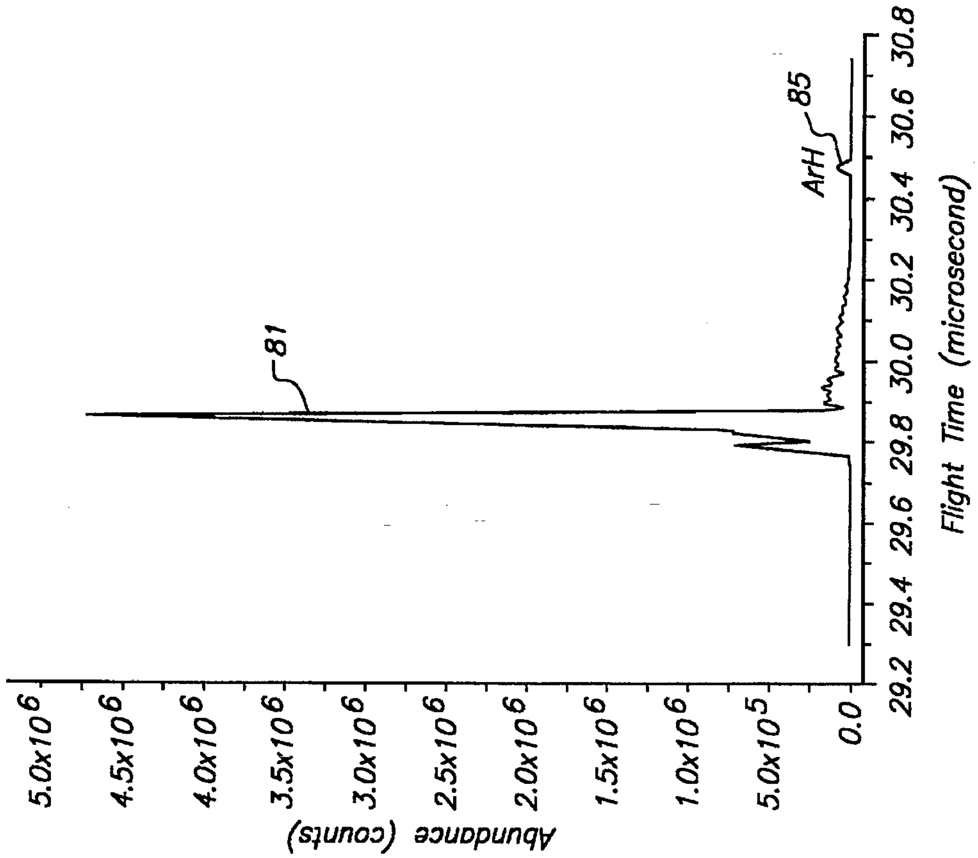
FIGS. 6 and 7 illustrate use of the mass spectrometer of FIG. 1 to reject specific ions according to the present invention. In particular.
Figure 6:
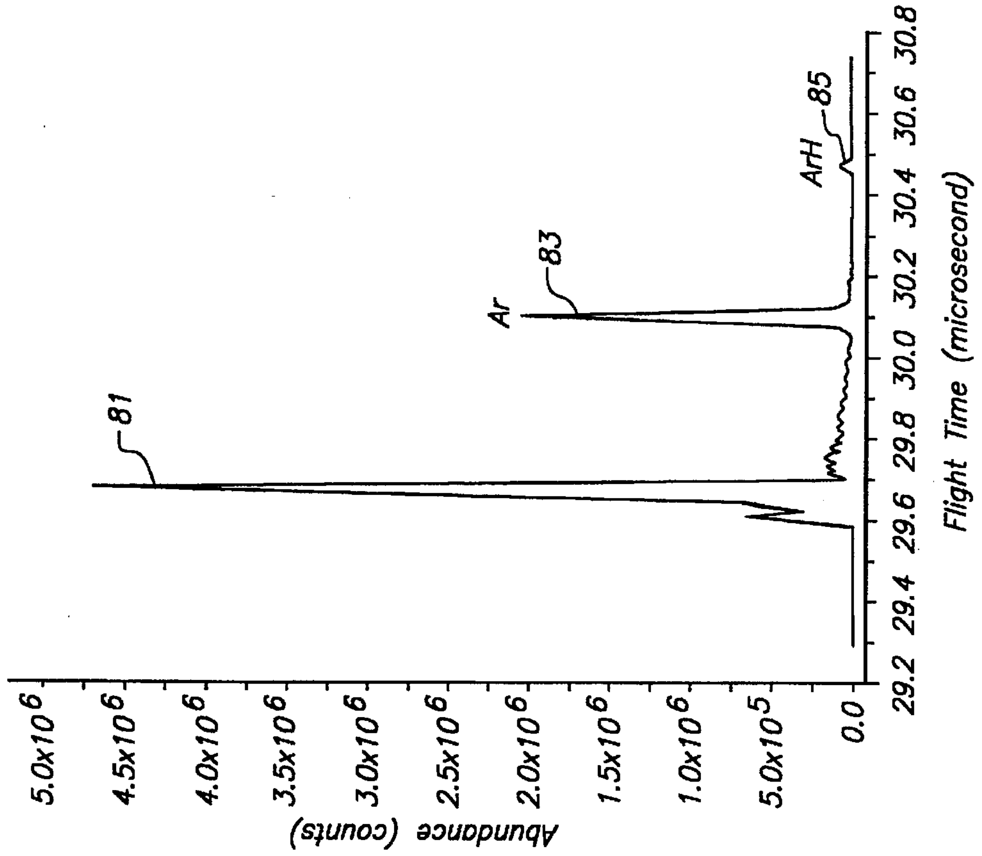

The packet of ions propelled by the ion pulser 17 passes through both of the acceleration grid 49 and the grounded grid 53, and into the field-free region 55. Since the gradient electric field applies the same force to all ions, irrespective of the ions' masses, the ions of differing masses will have different velocities and will arrive at the ion detector 19 at different times. The ion detector provides a readout of ion count with respect to time, which indicates the potential/mass ratio of all of the ions which have been sampled. Examples of such a readout are seen in FIGS. 3, 6 and 7.

A. Noise And The Retarding grid assembly 21.

As indicated earlier, noise affects detection of ions, since stray ("noise") ions may arrive at random times at the ion detector 19 and hence cloud accuracy of the measurement and resultant readout. The preferred mass spectrometer 11 substantially eliminates this noise by using the retarding grid assembly 21 to block passage of stray ions to the detector.

Since the preferred spectrometer uses perpendicular ion injection, it is not very probable that background noise is generated by photons and neutral particles, which would remain unaffected by the gradient electric field and continue along the entry direction 57. However, only a small percentage of the ion stream 45 is selectively and deliberately sampled by the ion pulser 17, although unmeasured ions are continuously injected into the vacuum chamber. A portion of these ions leak from the ion pulser 17 during the 98% of the time that the ion pulser remains in a channeling mode, and because of the electric field gradient that always exists between the acceleration grid 49 and the grounded grid 53, ions which leak may be accelerated toward the ion detector 19 and arrive at near-random times.

Figure 2:
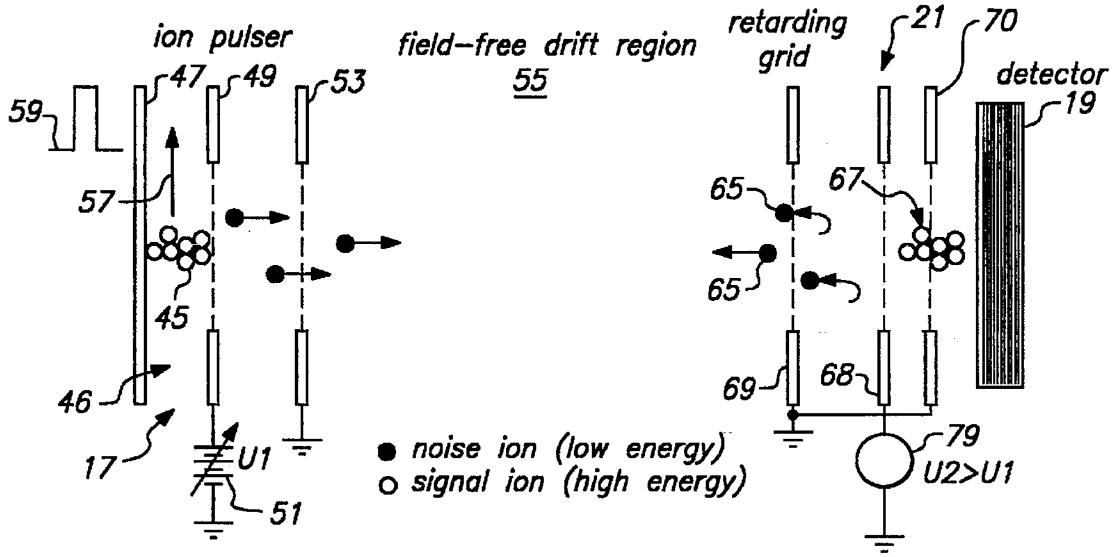
FIG. 2 is an illustrative view of the mass spectrometer of FIG. 1, used to help explain the use of a retarding grid assembly.

To counter this effect, as indicated in FIG. 2, the retarding grid assembly 21 is positioned to completely block the passage of all ions to the ion detector 19, and it is charged to have a voltage ("U2") that is greater than a normal voltage "U1" (which is preferably 420-volts, as mentioned) used to channel ions within the ion pulser 17. In other words, the repeller voltage is strong enough to repel noise ions 65 that inadvertently escape from the ion pulser. As a result, the noise ions 65 will lose their kinetic energy and will finally turn in the reverse direction. On the other hand, it generally is not desired to repel signal ions 67 that are deliberately launched from the ion pulser, and therefore, the normal repeller voltage is preferably not larger than 520-volts, e.g., the pulsed voltage applied to the repelling plate 47 to sample the ion stream. Using these criteria, only the signal ions 67 (which have relatively higher kinetic energy than the noise ions 65) will have sufficient kinetic energy to overcome the potential barrier of the retarding grid assembly 21 and reach the ion detector.

The retarding grid assembly 21 includes at least one conductive, charged grid 68 which is positioned proximate to the ion detector 17 and is formed of nickel or gold-coated aluminum wires. It should be at least 80% transmissive to signal ions 67. Preferably, the charged grid 68 is 85–90% transmissive to signal ions and is composed of a weave of about 100-wires per inch, with wires being 0.00078 inches in diameter and 0.00922 inches in spacing between the wires. The retarding grid assembly 21 preferably also includes two grounded buffer grids 69 and 70, one 69 between the charged grid 68 and the field-free region 55, and the other 70 between the charged grid 68 and the ion detector 19. The latter buffer grid 70 is used to minimize any capacitive coupling between the charged grid 68 and the ion detector.

II. Use Of Charge To Propel Ions And Discriminate Noise

Figure 4:
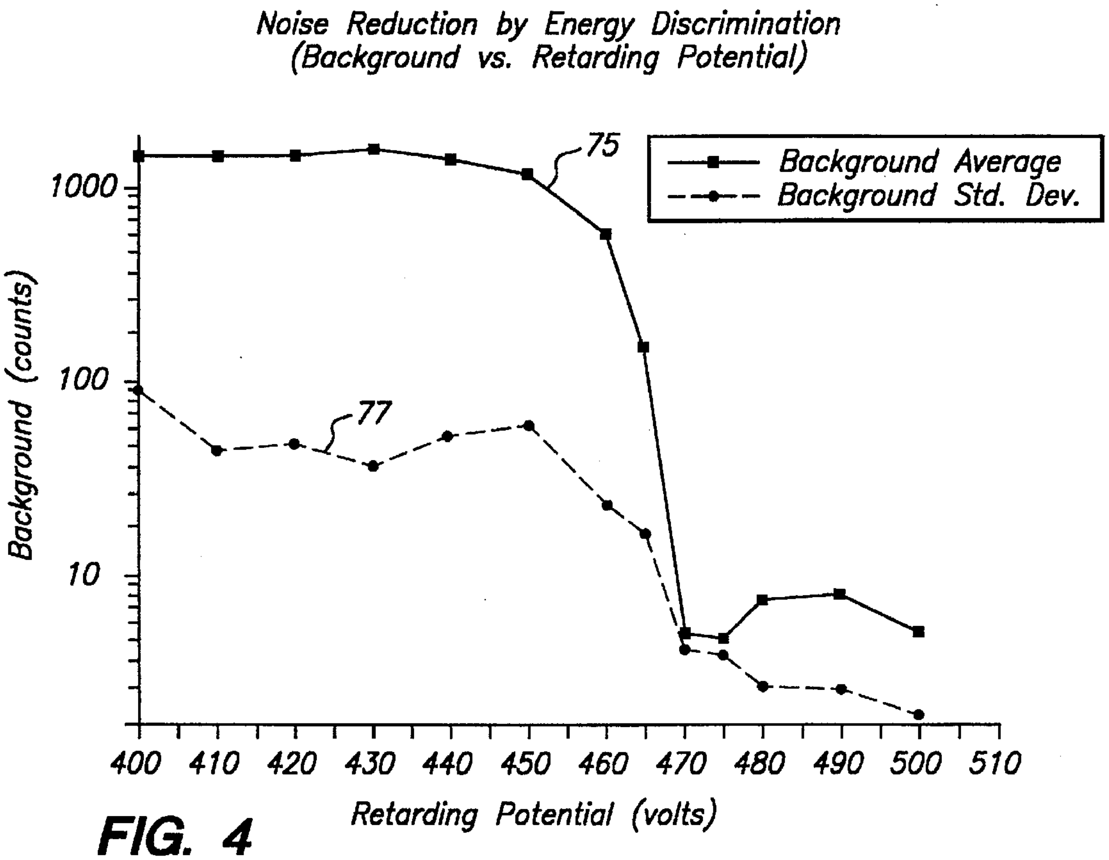
FIG. 4 is a graph of average background noise for different retarding grid assembly voltages for the mass spectrometer of FIG. 1; each of background noise and standard deviation of background noise are graphed for retarding grid assembly voltages between 400- to 510-volts.
Figure 5:
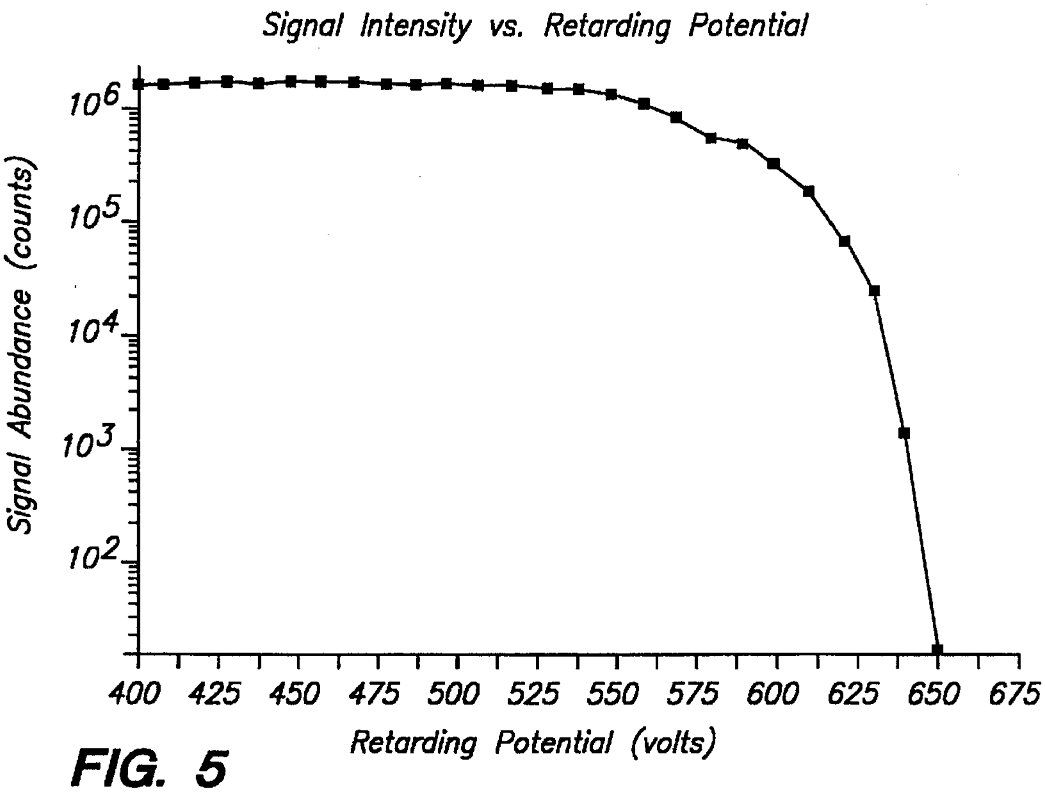
FIG. 5 is a graph that helps show how increasing retarding grid assembly voltage (while the propulsion voltage is held constant) affects detection of signal ions.

FIGS. 3–5 help illustrate the effects of the retarding grid assembly 21 upon signal strength and noise, and provide data for selecting appropriate voltage sources used for the preferred embodiment.

FIG. 3 shows two mass spectrometer readouts over a mass range of 126 to 140 atomic mass units (AMUs), with deionized water being the measurement solution. In particular, an upper graph 71 represents detected ions with the retarding grid assembly 21 neutralized (by grounding, for purposes of comparison), while a lower graph 73 represents measurement with the retarding grid assembly active and charged to 500-volts. Each of these measurements was produced with 5-seconds of recording time, corresponding to roughly 65,000 sampling pulses. The measurement represented by the upper graph 71 produced an average background noise count of about 1300-counts, with peaks observed to a high degree of reliability only at 127-, 129-, 131- and 132-atomic mass units. On the other hand, the noise-reduced measurement represented by the lower graph 73 yielded an average background noise of about 15-counts, and peaks are readily observed at each integer atomic mass unit interval. These peaks represent impurities in the deionized water or argon gas, for example, xenon at 128-, 129-, 130-, 131-, 132-, 134- and 136-atomic mass units, iodine at 127-atomic mass units, cesium at 133-atomic mass units, and barium at 138-atomic mass units. As is readily observed by comparing the two graphs of FIG. 3, enhanced detection of trace elements is facilitated with the retarding grid assembly 21 charged to 500-volts.

FIG. 4 shows a graph representing average noise 75 and standard deviation 77 as a function of retarding grid assembly voltage. In the graph, deionized water is again used as the sample solution, and the measurement indicates that for low-retarding grid assembly voltages (400- to 450-volts), approximately 250-counts per second per channel of measurement noise is detected. When the retarding voltage is increased to approximately 475-volts, however, the average noise level is reduced to about 1-count per second per channel. FIG. 4 indicates that, for the particular equipment used in performing the measurement, approximately 475-volts represents an appropriate potential to substantially reduce noise at the ion detector.

FIG. 5 indicates the effect of the retarding grid assembly 21 at various voltages upon the measurement signal. In particular, for a 10-part-per-million cesium/water solution and a repelling plate pulse of about 120-volts, the cesium signal remains constant for a retarding grid assembly voltage up to approximately 560-volts, beyond which the cesium signal begins to decline substantially. FIG. 5 indicates that the detected cesium ions had an average energy of 560-electron volts, which generally corresponds to the effect of the repelling pulse (540-volts) and provides potential difference for distinguishing the noise ions of FIG. 4 (which as indicated above were determined to have an energy of approximately 460-electron volts).

FIGS. 3–5 indicate that the mass spectrometer of the present invention provides significantly reduced noise without adverse effects upon the signal to be measured. In addition, they indicate a preferred retarding grid assembly potential of 475- to 560-volts for a ion pulser having a normal channeling voltage of 420-volts and a driving pulse of 120-volts.

III. Ions-Selective Discrimination

The retarding grid assembly 21 of the preferred mass spectrometer 11 is also useful to provide an ion-selective filter. Used in this ion-selective mode, the retarding grid assembly is charged to always have a predetermined minimum voltage (e.g., 500 volts) but is varied above this voltage to accept or reject specific signal ions. For example, using a voltage control device 79 to provide a large, appropriately-timed pulse to the retarding grid assembly (e.g., a 200-volt pulse applied for 100-nanoseconds, 29.8-microseconds after the pulse applied by the ion pulser), argon ions may be specifically blocked from reaching the ion detector 19. Alternatively, if it were desired to admit only specific ions, for example, argon ions, a 700-volt potential could be normally applied to the retarding grid assembly 21 and selectively dropped to 500-volts for 100-nanoseconds, 29.8-microseconds after the pulse of the ion pulser.

In practice, the ion-selective mode is generally used to reject or accept multiple ions, not to simply exclude only argon. For example, with the preferred mass spectrometer 11 described above, the plasma source 13 operates under a near-normal atmosphere (composed of air), and therefore it also generates a large number of nitrogen ions. Thus, both argon and nitrogen gas ions have a strong presence in an unfiltered spectrograph, which it is desired to remove. Other methods of measuring trace elements can also produce large number of ions which are not significant for the desired measurement. For example, in measuring trace impurities in a sample of aluminum using glow discharge sputtering to generate signal ions, measurement of aluminum ions (e.g., a "matrix" ion) generally is not required. In these conditions, it is contemplated that the ion-selective mode will be used to selectively reject or admit multiple ion masses, and not just a single specific ion.

FIGS. 6 and 7 show the effects of ion-selective discrimination, and in general, three peaks are represented in these figures. A first peak 81 represents capacitive coupling between the retarding grid assembly 21 and the ion detector 19 as the retarding voltage is pulsed. A second peak 83 appearing only in FIG. 6 represents arrival of argon ions at the ion detector. Finally, a third peak 85 seen in both FIGS. 6 and 7 represents the arrival of argon-hydrogen ions at the detector. In FIG. 6, the pulse applied to the retarding grid assembly has been advanced by approximately 450-nanoseconds, such that no argon ion discrimination is affected, e.g., the retarding grid assembly returns to its 500-volt potential before the arrival of the argon ions. By contrast, FIG. 7 indicates that with an appropriately timed 100-nanosecond pulse applied to the ion detector, argon ions are almost perfectly rejected, substantially without affecting detection of the argon-hydrogen ions.

As FIG. 7 indicates, specific control of the retarding grid assembly 21 is effective to repel certain ions that would otherwise arrive at the detector, without otherwise substantially affecting the desired signal (e.g., the third peak 85). This result is facilitated through use of the buffer grid 69, as mentioned above, which helps maintain a field-free region away from the retarding grid assembly 21. Consequently, rejection of ions may be narrowly tailored to a specific range of masses with appropriate voltage control.

Having thus described an exemplary embodiment of the invention, it will be apparent that further alterations, modifications, and improvements will also occur to those skilled in the art. Further, it will be apparent that the present invention is not limited to the specific form of spectrometer or retarding device described above. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

I claim:

1. A mass spectrometer, comprising:

an ionizing device that ionizes a sample;

an ion detector;

a ion pulser that receives ions from the ionizing device and that selectively propels signal ions toward the ion detector using a predetermined propelling potential, the ion pulser also emitting stray ions having an associated potential which is less than the predetermined propelling potential; and a retarding grid assembly positioned to block the path of all ions toward the ion detector, the retarding grid assembly continuously charged with at least a predetermined repelling potential which is greater than the potential associated with the stray ions but less than the predetermined propelling potential, such that the retarding grid is overcome by the signal ions but filters the stray ions by repelling them from the detector.

2. A mass spectrometer according to claim 1, wherein the ion pulser:

includes a repelling plate and an acceleration grid that are substantially parallel; is positioned to receive and normally channel ions along a first direction, in a path parallel to the repelling plate and the acceleration grid, and between them; and includes a pulse mechanism that selectively and deliberately propels the signal ions toward the ion detector by selectively applying a pulsed voltage to the repelling plate, to thereby direct ions through the acceleration grid and toward the ion detector.

3. A mass spectrometer according to claim 2, wherein the ion pulser:

further includes an electric power supply that normally applies a similar potential to each of the repelling plate and acceleration grid, such that each of the repelling plate and the acceleration grid normally each have a first potential associated with them; and the pulse mechanism selectively and deliberately propels the signal ions by applying a second, greater potential to the repelling plate, to thereby propel signal ions substantially orthogonal to the entry direction, toward the ion detector.

4. A mass spectrometer according to claim 3, wherein the predetermined repelling potential is chosen to normally be between first potential and the second, greater potential, such that signal ions which are associated with the second potential are passed by the retarding grid assembly on to the ion detector, while stray ions which may have otherwise escaped the ion pulser and be associated only with the first potential, are not passed on to the ion detector.

5. A mass spectrometer according to claim 1, wherein the repelling grid assembly includes a conductive grid having a density of approximately one hundred conductive wires per inch.

6. A mass spectrometer according to claim 1, wherein:

the repelling grid assembly includes a conductive, charged grid which is relatively closer to the ion detector and a buffer grid which is relatively further away from the ion detector than the conductive, charged grid.

7. A mass spectrometer according to claim 6, wherein the buffer grid is connected to ground.

8. A mass spectrometer according to claim 6, wherein the retarding grid assembly includes at least two buffer grids, which sandwich the conductive, charged grid between them.

9. A mass spectrometer according to claim 1, wherein the ionizing device includes an inductively coupled plasma source.

10. A mass spectrometer according to claim 1, further comprising a voltage control device that increases the repelling potential at a predetermined time, to thereby cause the retarding grid assembly to also selectively filter selective ions from the signal ions according to time-of-flight.

11. A mass spectrometer according to claim 10, wherein the voltage control device increases the repelling potential at predetermined times chosen to reject argon ions.

12. A mass spectrometer according to claim 10, wherein the voltage control device is configured to increase the repelling potential at selective times to reject multiple, different ions from the signal ions.

13. An improved time-of-flight mass spectrometer that uses an ionizing device to generate ions from a sample and to inject the ions into a vacuum chamber, and a ion pulser normally using a channeling mode, which uses a first potential to channel ions in a first direction, and selectively using propulsion mode that uses a second potential greater than the first potential to propel ions toward a detector to arrive at the detector at different times in dependence upon their mass-to-charge ratio, the improvement comprising:

a retarding grid assembly positioned to block the path of ions toward the detector, the retarding grid assembly being continuously charged to have at least a predetermined potential that rejects stray ions while permitting the passage of signal ions through the retarding grid assembly to the detector, the predetermined potential chosen to lie between the first and second potentials to thereby reject stray ions which have escaped the ion pulser during the channeling mode, but not reject signal ions which have escaped the ion pulser during the propulsion mode.

14. An improved mass spectrometer according to claim 13, the improvement further comprising a voltage device that controls the retarding grid assembly to have at least the potential that rejects ions which have escaped the ion pulser during the channeling mode, but also to selectively increase the potential held by the retarding grid assembly above the second potential to thereby impose an ion selective filter upon the signal ions.

15. An improved mass spectrometer according to claim 13, the improvement further comprising a voltage device that controls the retarding grid assembly to further impose an ion selective filter upon the signal ions, by increasing the potential of the retarding grid assembly beyond the second potential at selective times chosen to correspond to the arrival of argon ions.

16. An improved mass spectrometer according to claim 15, the improvement further comprising a voltage device that controls the retarding grid assembly to reject at least two specific, different ions from the signal ions.

17. A method of determining components of a substance using an ionizing device, an ion pulser that receives ions from the ionizing device, a detector, a voltage device and a retarding grid assembly positioned to block a path of the ions toward the detector, said method comprising:

ionizing the components to generate ions;

selectively using the ion pulser to deliberately propel signal ions toward the detector, by selectively applying a second potential to thereby launch signal ions in packets toward the detector;

continuously energizing the retarding grid assembly using the voltage device, such that the retarding grid has at least a predetermined potential, less than the second potential, the predetermined potential selected to permit passage of signal ions that have been deliberately propelled toward the detector using the ion pulser, but to block passage of stray ions that have not been deliberately propelled toward the detector using the second potential; and detecting ions that have been passed by the retarding grid assembly to determine the components of the substance.

18. A method according to claim 17, further comprising:

selectively energizing the retarding grid assembly beyond the predetermined potential and the second potential, to further impose an ion selective filter upon the signal ions.

19. A method according to claim 17, wherein the ionizing device includes a plasma source that utilizes a specific gas to form a plasma, and wherein selectively energizing the retarding grid assembly includes energizing it beyond the second potential at specific times corresponding to the expected arrival of ions of the specific gas, to repel ions of the specific gas.

20. A method according to claim 17, wherein selectively energizing the retarding grid assembly includes energizing it beyond the second potential at times selected to repel both argon and one of nitrogen and a matrix material.

21. A mass spectrometer, comprising:

an ion source that generates ions;

a vacuum chamber having two opposing ends;

an ion pulser mounted proximate to one of the opposing ends of the vacuum chamber, the ion pulser receiving ions from the ion source;

an ion detector mounted proximate to the other of the opposing ends of the vacuum chamber; and a retarding grid assembly positioned to block the path of ions from the ion pulser toward the ion detector, the retarding grid assembly having at least a predetermined repelling potential associated with it;

wherein the ion pulser includes two grids that normally are held at the same potential and normally channel ions along a first path, one of the two grids of the ion pulser is selectively energized to have a greater potential, to deliberately propel a packet of signal ions toward the ion detector, and divert the path of the signal ions away from the first path, and the predetermined repelling potential is chosen to lie between the same potential and the greater potential, such that the retarding grid assembly passes signal ions to the ion detector, but repels stray ions which have not been deliberately propelled toward the ion detector as part of the packet of signal ions.

* * * * *